United States Patent
Garthwaite et al.

(10) Patent No.: US 7,475,397 B1
(45) Date of Patent: Jan. 6, 2009

(54) METHODS AND APPARATUS FOR PROVIDING A REMOTE SERIALIZATION GUARANTEE

(75) Inventors: Alexander T. Garthwaite, Beverly, MA (US); David Dice, Foxborough, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 859 days.

(21) Appl. No.: 10/900,636

(22) Filed: Jul. 28, 2004

(51) Int. Cl.
*G06F 9/46* (2006.01)
*G06F 9/30* (2006.01)

(52) U.S. Cl. .................. 718/101; 718/104; 712/203

(58) Field of Classification Search ............. 719/312, 719/330; 718/101, 104; 712/203
See application file for complete search history.

(56) References Cited

U.S. PATENT DOCUMENTS

| | | | |
|---|---|---|---|
| 3,984,820 A | 10/1976 | Stanley et al. | 340/172.5 |
| 4,908,750 A | 3/1990 | Jablow | 364/200 |
| 5,197,130 A | 3/1993 | Chen et al. | 712/3 |
| 5,228,131 A | 7/1993 | Ueda et al. | 395/375 |
| 5,438,677 A | 8/1995 | Adams et al. | 395/736 |
| 5,504,817 A | 4/1996 | Shamir | 380/30 |
| 5,555,370 A | 9/1996 | Li et al. | 395/161 |
| 5,611,063 A | 3/1997 | Loper et al. | 395/381 |
| 5,615,350 A | 3/1997 | Hesson et al. | 395/394 |
| 5,671,381 A | 9/1997 | Strasnick et al. | 395/355 |
| 5,765,206 A | 6/1998 | Hohensee et al. | 711/203 |
| 5,796,830 A | 8/1998 | Johnson et al. | 380/286 |
| 5,799,086 A | 8/1998 | Sudia | 705/76 |
| 5,838,792 A | 11/1998 | Ganesan | 380/282 |
| 5,892,828 A | 4/1999 | Perlman | 713/183 |
| 5,898,850 A | 4/1999 | Dickol et al. | 712/229 |
| 5,898,885 A | 4/1999 | Dickol et al. | 712/36 |
| 5,905,895 A | 5/1999 | Halter | 717/139 |
| 5,907,618 A | 5/1999 | Gennaro et al. | 380/286 |
| 5,907,707 A | 5/1999 | Ramalingam et al. | 717/104 |
| 5,913,065 A | 6/1999 | Faustini | 717/107 |
| 5,937,066 A | 8/1999 | Gennaro et al. | 380/286 |
| 5,943,496 A | 8/1999 | Li et al. | 719/328 |

(Continued)

OTHER PUBLICATIONS

Card, Stuart K., et al. "The WebBook and the Forager: an informational workspace for the World-Wide Web", ACM Conference, 1996, pp. 111-117.

(Continued)

*Primary Examiner*—Meng-Ai An
*Assistant Examiner*—Camquy Truong
(74) *Attorney, Agent, or Firm*—Brooks Kushman P.C.

(57) ABSTRACT

A technique provides a remote serialization guarantee within a computerized system. The technique involves (i) receiving a serialization command from a first thread running on a first processor of the computerized system; (ii) running, on a second processor, a second thread up to a serialization point; and (iii) outputting a serialization result to the first thread in response to the serialization command. The serialization result indicates that the second thread has run up to the serialization point. Such operation enables the first and second threads to robustly coordinate access to a shared resource by the first thread incurring both the burden of employing a MEMBAR instruction and the burden of providing the remote serialization command when attempting to access the shared resource, and the second thread not running any MEMBAR instruction when attempting to access the shared resource to enable the second thread to run more efficiently.

22 Claims, 5 Drawing Sheets

U.S. PATENT DOCUMENTS

| | | | | |
|---|---|---|---|---|
| 5,974,256 | A | 10/1999 | Matthews et al. | 717/141 |
| RE36,462 | E | 12/1999 | Chang et al. | 711/209 |
| 6,006,227 | A | 12/1999 | Freeman et al. | 707/7 |
| 6,011,918 | A | 1/2000 | Cohen et al. | 717/106 |
| 6,012,072 | A | 1/2000 | Lucas et al. | 715/526 |
| 6,052,699 | A | 4/2000 | Huelsbergen et al. | 707/206 |
| 6,055,605 | A * | 4/2000 | Sharma et al. | 711/130 |
| 6,070,010 | A | 5/2000 | Keenleyside et al. | 717/154 |
| 6,074,432 | A | 6/2000 | Guccione | 717/108 |
| 6,075,942 | A | 6/2000 | Cartwright, Jr. | 717/138 |
| 6,081,665 | A | 6/2000 | Nilsen et al. | 717/116 |
| 6,086,623 | A | 7/2000 | Broome et al. | 703/26 |
| 6,106,571 | A | 8/2000 | Maxwell | 717/131 |
| 6,108,737 | A * | 8/2000 | Sharma et al. | 710/107 |
| 6,131,187 | A | 10/2000 | Chow et al. | 717/106 |
| 6,141,794 | A | 10/2000 | Dice et al. | 717/118 |
| 6,151,703 | A | 11/2000 | Crelier | 717/136 |
| 6,158,048 | A | 12/2000 | Lueh et al. | 717/118 |
| 6,182,274 | B1 | 1/2001 | Lau | 717/104 |
| 6,253,215 | B1 | 6/2001 | Agesen et al. | 707/206 |
| 6,253,218 | B1 | 6/2001 | Aoki et al. | 715/526 |
| 6,289,451 | B1 | 9/2001 | Dice | 713/168 |
| 6,304,949 | B1 | 10/2001 | Houlsdworth | 711/170 |
| 6,308,315 | B1 | 10/2001 | Dice et al. | 717/106 |
| 6,327,701 | B2 | 12/2001 | Ungar | 717/5 |
| 6,430,670 | B1 | 8/2002 | Bryg et al. | 711/216 |
| 6,438,673 | B1 | 8/2002 | Jourdan et al. | 711/213 |
| 6,467,007 | B1 | 10/2002 | Armstrong et al. | 710/260 |
| 6,530,017 | B1 | 3/2003 | Dice et al. | 712/242 |
| 6,658,652 | B1 | 12/2003 | Alexander, III et al. | 717/128 |
| 6,677,962 | B1 | 1/2004 | Bailey | 345/744 |
| 6,697,834 | B1 | 2/2004 | Dice | 718/102 |
| 6,799,236 | B1 | 9/2004 | Dice et al. | 710/200 |
| 6,854,048 | B1 | 2/2005 | Dice | 712/216 |
| 6,862,674 | B2 | 3/2005 | Dice et al. | 711/170 |
| 6,877,088 | B2 | 4/2005 | Dice | 712/235 |
| 6,901,596 | B1 * | 5/2005 | Galloway | 719/330 |
| 6,904,597 | B2 * | 6/2005 | Jin | 719/314 |
| 2001/0020956 | A1 | 9/2001 | Moir | 345/765 |
| 2001/0042189 | A1 | 11/2001 | Babaian et al. | 712/23 |

OTHER PUBLICATIONS

Bershad, Brian N., "Fast Mutual Exclusion for Uniprocessors", ACM Sigplan Notices: vol. 27, Issue 9, (Sep. 1992), pp. 223-233.

Newhall, Tia, et al., "Performance Measurement of Dynamically Complied Java Executions", JAVA ACM, 1999, pp. 42-50.

Ishizaki, Kazuaki, et al., "Design, Implementation, and Evaluation of Optimizations in a Just-In-Time Compiler", JAVA ACM, 1999, pp. 119-128.

Chang, Chi-Chao, et al., "Interfacing Java to the Virtual Interface Architecture", JAVA ACM, 1999, pp. 51-57.

Slye, J.H., et al. "Support for software interrupts in log-based roll-back-recovery", IEEE, Oct. 1998, vol. 47, Issue: 10, (Abstract Only).

Barua, S., Computer-based multimedia system on "computer organization and design", IEEE, Oct. 1997, (Abstract Only).

* cited by examiner

METHODS AND APPARATUS FOR PROVIDING A REMOTE SERIALIZATION GUARANTEE

BACKGROUND OF THE INVENTION

A typical computer system includes processing circuitry, memory and an input/output (I/O) interface. The processing circuitry includes a set of processors (i.e., one or more processors) which is configured to run code stored in the memory (e.g., an operating system, command scripts, high level applications, other software constructs, etc.). The memory typically includes both random access memory (e.g., volatile semiconductor memory) as well as relatively slower non-volatile memory (e.g., disk drive memory). The I/O interface allows communications into and out of the computer system to enable external access to the computer system (e.g., user access, network communications with external devices, etc.).

Some computer systems enable multiple threads or processes (hereinafter generally referred to as threads) to share access to certain computer resources such as shared memory. These threads are configured to run simultaneously on the processing circuitry and share access to the shared memory (e.g., for inter-process communications). To prevent the threads from concurrently accessing the same shared memory data structure (e.g., a single location, a complex data structure such as a linked list involving many locations, etc.) at the same time and thus inadvertently corrupt data within that shared data structure, software developers typically employ one or more synchronization approaches which enable the simultaneously-running threads to coordinate their access of shared memory. Such approaches enable mutual exclusion where at most a single thread of the multiple threads running in parallel is permitted access to protected code or data at any time.

In one conventional synchronization approach (hereinafter referred to as the atomic instruction approach), the computer platform provides atomic operations or instructions. Examples include compare-and-swap (CAS), load-locked and store-conditional, exchange and fetch-and-add operations. The Intel® IA32 Architecture, which is offered by Intel Corporation of Santa Clara, Calif., provides CAS instructions under the name "cmpxchg".

In another conventional synchronization approach (hereinafter referred to as the simple load-store approach), the computer system provides a set of common memory locations, and each thread is configured to set and test the contents of these memory locations to determine whether that thread has access to a critical section. Classic examples of conventional load-store based synchronization mechanisms include Dekker, Dijkstra, Lamport and Peterson. For illustration purposes only, a short explanation of a simplified Dekker mechanism will now be provided.

Suppose that there are two threads running on a computer system. Both threads synchronize their execution in order to share access to a critical section of code using commonly accessible memory variables T1 and T2 which are initially zero. When the first thread is ready to access the critical section, the first thread stores a non-zero value into the memory variable T1, and loads the value of the memory variable T2. If the value of the memory variable T2 is non-zero, the first thread is blocked from accessing the critical section due to the second thread having a "lock" on the critical section. Accordingly, the first thread then clears the memory variable T1 and retries. However, if the value of the memory variable T2 is zero, the first thread obtains a lock on the critical section, accesses the critical section, and then sets the memory variable T1 back to zero.

Similarly, when the second thread is ready to access the critical section, the second thread stores a non-zero value into the memory variable T2, and loads the value of the memory variable T1. If the value of the memory variable T1 is non-zero, the second thread is blocked from accessing the critical section due to the first thread having a lock on the critical section. In response, the second thread clears the memory variable T2 and retries. However, if the value of the memory variable T1 is zero, the second thread obtains a lock on the critical section, accesses the critical section, and then clears the memory variable T2.

It should be understood that the above-provided explanation is simplified for illustration purposes and is vulnerable to "livelock" where both the first thread and the second thread attempt to enter the critical section simultaneously and then perpetually spin, retrying. In practice, code developers augment the mutual exclusion mechanism with additional logic so that the two threads take turns to ensure progress and avoid livelock.

It should be further understood that certain processor architectures do not guarantee that, when multiple threads are running in parallel, each thread will be able to accurately view operations of the other threads in correct order. Rather, by not making such a guarantee, these processor architectures are able to enjoy certain optimizations (e.g., processor design optimizations, interconnect optimizations, etc.) which offer the potential to improve overall system performance. In particular, in the context of the above-described simplified Dekker mechanism, the store and load operations of each thread may be presented to the other thread out of order. Such reordering typically arises from out-of-order execution or by virtue of a processor's store buffer construct. For example, even though a thread may perform a store operation ahead of a load operation, the processor may place the store operation in a store buffer while making the subsequent load operation immediately visible to other threads on a communications bus thus showing the other threads the load operation before the store operation in an incorrect order. Unfortunately, if the system makes the store and load operations visible in the wrong order, the Dekker mechanism can fail and permit two threads to access the same critical section at one time. This is commonly termed an exclusion failure and is extremely undesirable as the data within the critical section can become inconsistent.

Examples of processor architectures which do not guarantee that threads will be able to accurately view operations of other threads in correct order are the SPARC® Architecture and the Intel® IA32 Architecture. The SPARC® Architecture is offered by SPARC® International, Inc. of San Jose, Calif. The Intel® IA32 Architecture is offered by Intel Corporation of Santa Clara, Calif.

To prevent exclusion failures, software developers utilize memory barrier (MEMBAR) instructions which provide certain guarantees regarding instruction order. In particular, a typical SPARC processor implements a MEMBAR instruction by delaying execution until the processor completely drains its store buffer to memory so that any stores within the store buffer become visible to other processors. At this point, the operation of the processor is considered to be "serialized" because the effects of all previously executed and committed instructions are now visible to other processors. Accordingly, a software developer implementing the Dekker mechanism within a thread places a MEMBAR instruction between the initial store instruction and the subsequent load instruction to serialize the store and load instructions from the perspective of other threads.

It should be understood that the effect of executing a MEMBAR instruction is restricted to the executing processor. That is, executing a MEMBAR instruction does not cause actions on any remote processors. Additionally, for some processors, if the processor supports out-of-order or speculative execution, speculation typically is not allowed to proceed past the MEMBAR instruction. That is, when such a processor encounters a MEMBAR instruction, the processor typically cancels the effects of any subsequent instructions that have started to execute speculatively in order to ensure serialization up to the MEMBAR instruction.

With reference back to the earlier-provided simplified Dekker mechanism, software developers place MEMBAR instructions in the code of the first and second threads to avoid exclusion failures. In particular, the developers position MEMBAR instructions between the store and load instructions in each thread thus forcing the processors to make the executed store and load operations visible in the correct order for proper Dekker mechanism operation. That is, when the first thread is ready to access the critical section, the first thread stores a non-zero value into the memory variable T1, performs a MEMBAR operation and loads the value of the memory variable T2. The MEMBAR operation in the first thread ensures that the executed store operation is visible to the second thread prior to the executed load operation. Similarly, when the second thread is ready to access the critical section, the second thread stores a non-zero value into the memory variable T2, performs a MEMBAR operation and loads the value of the memory variable T1. Again, the MEMBAR operation in the second thread ensures that the executed store operation is visible to the first thread prior to the executed load operation, i.e., in the correct order).

SUMMARY

Unfortunately, there are deficiencies to the above-described conventional synchronization approaches. In particular, in connection with the above-described conventional atomic instruction approach, atomic instructions are relatively slow. For example, the conventional CAS instruction typically requires 50 to 200 cycles to complete.

Additionally, in connection with the above-described conventional simple load-store approach which uses MEMBAR instructions to ensure proper operation of the Dekker mechanism, MEMBAR instructions are extremely expensive to perform. In particular, each MEMBAR instruction is capable of incurring a latency of more than 400 cycles thus imposing a severe burden on each thread executing a MEMBAR instruction. Accordingly, in the context of two running threads sharing access to a shared resource where a first thread runs through the Dekker mechanism very infrequently while a second thread runs through the Dekker mechanism very frequently, the second thread is unfortunately taxed with performing many MEMBAR instructions by frequently entering the Dekker mechanism even though the second thread rarely contends with the first thread for the shared resource due to the first thread's infrequent access of the shared resource.

In contrast to the above-described conventional synchronization approaches (e.g., conventional atomic compare-and-swap operations, conventional dual use of MEMBARs) which suffer from long-latency inefficiencies, embodiments of the present invention are directed to techniques for providing a remote serialization guarantee within a computerized system which utilizes a processor architecture in which it is possible for threads to view operations of other threads out of order. Here, a thread running on a first processing device is capable of sending a serialization command to a second processing device. The second processing device responds to the serialization command by returning a serialization result guaranteeing that the thread running on the first processing device is now capable of seeing all store operations which had been buffered by the second processing device up to the point of receiving the serialization command, i.e., the serialization point. Accordingly, when the thread is ready to acquire a lock on a shared resource using a Dekker store-load synchronization mechanism, the thread can invoke the serialization command to make sure that there is not another thread that has already locked the shared resource (all buffered store operations will be made visible to the thread) and thus avoid an exclusion failure. Moreover, since such a serialization guarantee is capable of being obtained by the thread remotely, the other thread does not need to run a MEMBAR instruction and thus is capable of running in a more optimized manner.

One embodiment of the invention is directed to a method for providing a remote serialization guarantee within a computerized system. The method includes (i) receiving a remote serialization command from a first thread running on a first processing device of the computerized system; (ii) running, on a second processing device, a second thread up to a serialization point; and (iii) outputting a remote serialization result to the first thread in response to the remote serialization command. The remote serialization result indicates that the second thread has run up to the serialization point. Such operation enables the first and second threads to robustly coordinate access to a shared resource by the first thread (e.g., a slow thread that infrequently access the share resource) incurring both the burden of employing a MEMBAR instruction and the burden of providing the remote serialization command when attempting to access the shared resource, and the second thread (e.g., a fast thread that frequently accesses the shared resource) not running any MEMBAR instruction when attempting to access the shared resource to enable the second thread to run more efficiently.

In one arrangement, the serialization result is a return value from a remotely invoked instruction (e.g., REMOTE_MEMBAR) implemented as a hardware enhancement on the second processing device where the second processing device completely drains its store buffer in response to the remotely invoked instruction. In another arrangement, the serialization result is a value stored over an initial value in response to a store operation remotely injected into the store buffer of the second processing device from the first thread to guarantee that any store operations buffered prior to the injected store operation are now visible to the first thread. In yet another arrangement, the serialization result is a count of completed store operations passing an earlier-obtained count of store operations issued by the second processing device to guarantee that any store operations buffered at the time of obtaining the count of store operations issued are now visible to the first thread. Such arrangements enables the second thread to run on the second processing device in a relatively unhindered manner without any MEMBAR instructions even though robust synchronization exists between the first and second threads.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention are directed to techniques for providing a remote serialization guarantee within a computerized system which utilizes a processor architecture in which it is possible for threads to view operations of other threads out of order. In particular, a thread running on a first processing device is capable of sending a serialization command to a second processing device. The second processing device responds to the serialization command by returning a serialization result guaranteeing that the thread running on the first processing device is now capable of viewing all store operations which had been buffered by the second processing device up to the point of receiving the serialization command, i.e., the serialization point. Accordingly, if the thread is ready to acquire a lock on a shared resource using a Dekker store-load synchronization mechanism, the thread can invoke the serialization command to make sure that there is not another thread that has already locked the shared resource (i.e., all store operations buffered on the second processing device will be made visible to the thread) and thus avoid an exclusion failure. Furthermore, since such a serialization guarantee is capable of being obtained by the thread in a remote manner, the other thread running on the second processing device does not need to run a MEMBAR instruction and thus is capable of running in more efficiently.

Figure 1:
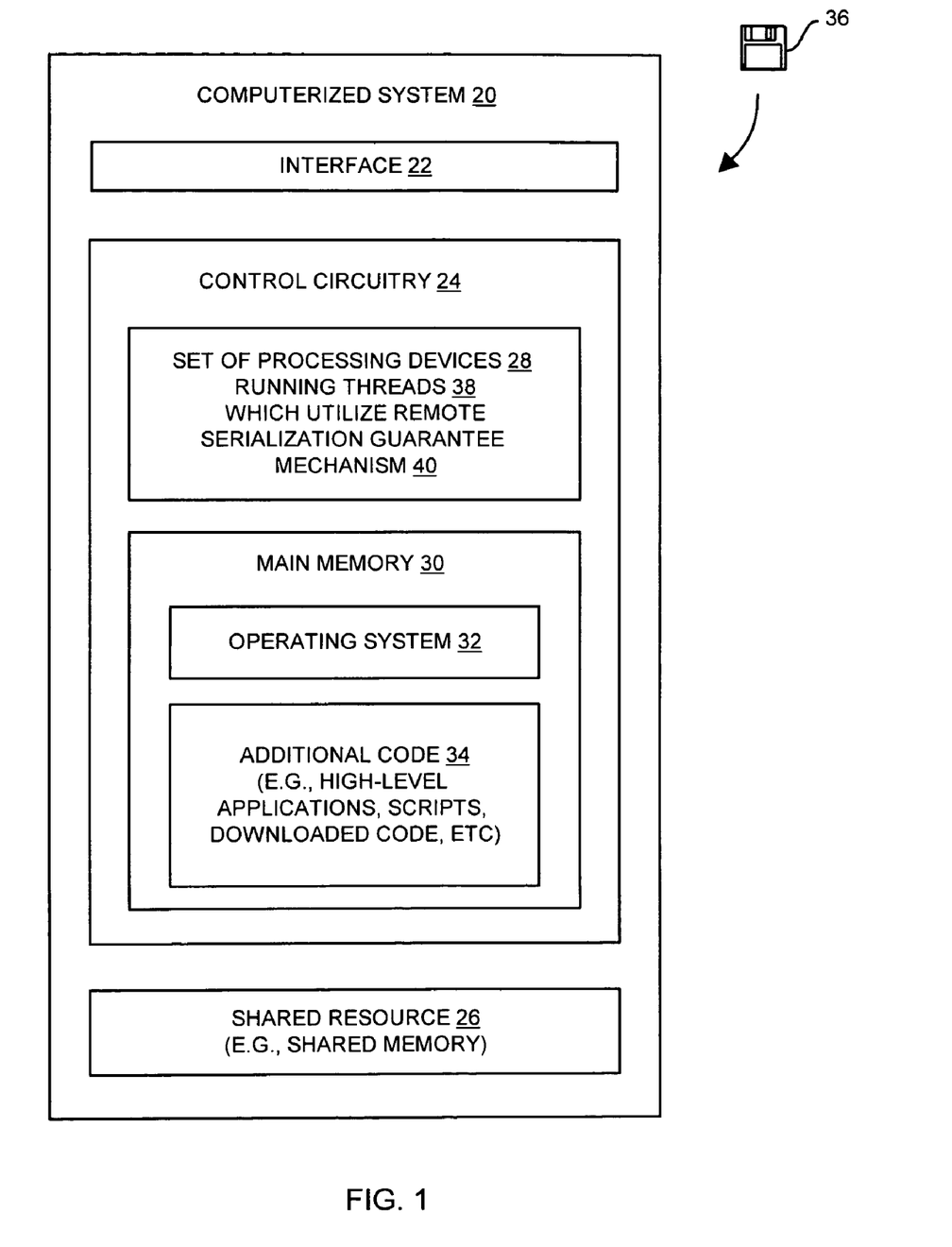
FIG. 1 is a block diagram of a computerized system which is suitable for use by the invention.

FIG. 1 shows a computerized system 20 which is suitable for use by the invention. The computerized system 20 includes an interface 22, control circuitry 24, and a shared resource 26. The interface 22 is configured to provide external access to the computerized system 20 (e.g., for a user, for communications with an external device, etc.). The shared resource 26 is a computerized resource of the system 20 which is sharable in a common manner among multiple computerized entities, e.g., threads, processes, processors, clients, etc. The control circuitry 24 operates as a controller of the computerized system 20 to perform certain programmed operations, e.g., to operate the computerized system 20 as a general purpose computer for one or more users, a host, a client or server, a data storage system, a data communications device, a compute engine, etc.

As shown in FIG. 1, the control circuitry 24 includes a set of processing devices 28 (one or more processing devices 28) and main memory 30 which couples to the set of processing devices 28. The main memory 30 stores a variety of memory constructs including an operating system 32 and additional code 34 (e.g., high-level applications, scripts, downloaded code, etc.). In some arrangements, the operating system 32 and the additional code 34 load into the main memory 30 through the interface 22 from computerized media 36 (e.g., CD-ROMs, diskettes, magnetic tape, propagated signals during network downloads, combinations thereof, and the like).

By way of example only, the shared resource 26 is sharable memory which is accessible by multiple threads or processes (hereinafter referred to as simply threads) running on the set of processing devices 28. Shared memory is typically used in symmetric-multiprocessor "SMP" systems (e.g., for coordinating access to critical code sections). Other suitable sharable resources 26 include logical devices, physical devices, and the like. It should be understood that the main memory 30 is capable of being formed from a combination of volatile memory (e.g., semiconductor memory) and non-volatile memory (e.g., disk drives), and that the shared memory is capable of residing in a contiguous or integrated manner with the main memory 30 (e.g., on one or more memory circuit boards containing semiconductor memory).

As will be explained in further detail with reference to other figures, threads 38 (and perhaps other threads and processes) simultaneously run on the control circuitry 24. The threads 38 are configured to access the shared resource 26 by utilizing a remote serialization guarantee mechanism 40 provided by the set of processing devices 28 that does not require MEMBAR instructions in all of the threads 38. Such a remote serialization guarantee mechanism 40 alleviates the need for the set of processing devices 28 to constantly guarantee that, when the multiple threads 38 are running in parallel, each thread 38 will be able to accurately view operations of the other threads 38 in correct order, thus enabling the system 20 to enjoy certain optimizations (e.g., processor design optimizations, interconnect optimizations, etc.) which offer the potential to improve overall system performance. Furthermore, such a remote serialization guarantee mechanism 40 is capable of providing significant cycle savings by reducing or even alleviating the need for MEMBAR instructions in certain threads 38.

Each processing device 28 is essentially a processor circuit board module having a processor (e.g., a microprocessor, a processor chipset, etc.). Examples of suitable processor architectures for such processors include those configured with either the SPARC® Architecture or the Intel IA32®& Architecture. A description of the SPARC® Architecture is available in a document entitled "The SPARC Architecture Manual, Version 9" by Weaver and Germond, SPARC International, Prentice-Hall, 1994, the teachings of which are hereby incorporated by reference in their entirety. This manual provides details of the SPARC-V9 Architecture which defines a Total Store Order (TSO) memory model (e.g., see Appendix J, "Programming with Memory Models).

As will now be explained with reference to other figures, the invention includes a variety of detailed embodiments implementing the remote serialization guarantee mechanism 40. In one embodiment (hereinafter referred to as the REMOTE_MEMBAR Instruction Embodiment), the remote serialization guarantee mechanism 40 is implemented as a memory barrier operation hardware enhancement within a standard set of processors, i.e., a thread 38 running on a first processing device 28 is configured to issue a REMOTE_MEMBAR instruction to a second processing device 28 (i.e., an electronic signal from the first processing device to the second processing device 28), and the second processing device 28 responds by draining its store buffer to make any buffered store operations of the second processing device 28 visible to the thread 38. In another embodiment (hereinafter referred to as the Remote Injected Store Operation Embodiment), the remote serialization guarantee mechanism 40 is implemented as an instruction injection enhancement within a standard set of processors, i.e., a thread 38 running on a first processing device 28 injects a store operation into the store buffer of a second processing device 28 so that, when the thread 38 sees the results of the store operation, the thread 38 knows with certainty that all store operations which were previously buffered by the second processing device 28 are visible to the thread 38. In yet another embodiment (hereinafter referred to as the Issued Counter/Completed Counter Embodiment), the remote serialization guarantee mechanism 40 is implemented using counters, i.e., a thread 38 running on a first processing device 28 reads an "issued" counter and subsequently reads a "completed" counter maintained by a second processing device 28 to determine when all store operations buffered by the second processing device 28 up to the point of reading the issued counter are now visible to the thread 38. Such embodiments enable another thread 38 running on the second processing device 28 to run in a relatively unhindered manner without any memory barrier instructions even though robust synchronization exists between the threads 38.

REMOTE_MEMBAR Instruction Embodiment

Figure 2:
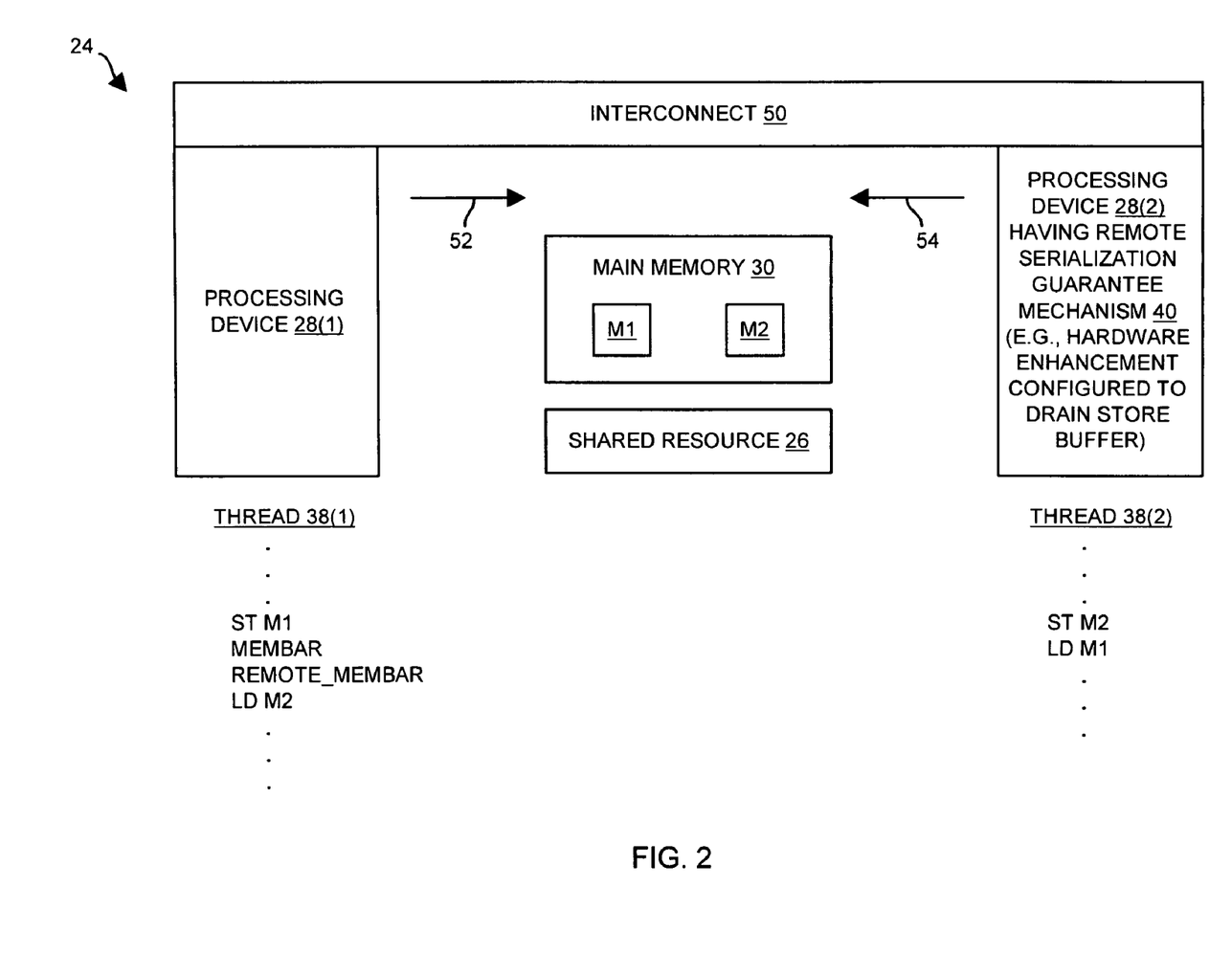
FIG. 2 is a block diagram of control circuitry of the computerized system of FIG. 1 in accordance with a first embodiment.

FIG. 2 shows particular details of the control circuitry 24 of the computerized system 20 (FIG. 1) when the remote serialization guarantee mechanism 40 is implemented in hardware by the processing devices 28 as a remote memory barrier instruction. In this embodiment, a thread 38 running on one processing device 28 issues the instruction to another processing device 28 causing that other processing device 28 to drain its store buffer thus making any buffered store operations visible to the thread 38.

By way of example only, the control circuitry 24 includes an interconnect 50 (e.g., a backplane having a multi-drop bus, point-to-point channels, etc.) and two processing devices 28(1), 28(2) which are configured to communicate through the interconnect 50. Also by way of example only, the processing devices 28 are configured to access main memory 30 and the shared resource 26 through the interconnect 50. The main memory 30 includes memory locations such as memory locations M1 and M2 which are commonly accessible by the processing devices 28. Although only two processing devices 28 are shown for simplicity, it should be understood that the control circuitry 24 is capable of including N processing devices 28 where N is any integer which is greater than or equal to one.

The threads 38 running on the processing devices 28 are asymmetric in their patterns of accessing the shared resource 26. In particular, a first thread 38(1) running on the processing device 28(1) is configured to infrequently access the shared resource 26. In contrast, a second thread 38(2) running on the processing device 28(2) is configured to frequently access the shared resource 26.

Exemplary pseudo-code for the Dekker synchronization portions of the threads 38(1), 38(2) is as follows:

Thread 38(1):
ST M1
MEMBAR #storeload
Cross-call to the processing device 28(2) on which thread 38(2) executes or last executed thread 38(2)
Wait for acknowledgement of the cross-call
LD M2
Thread 38(2):
ST M2
LD M1

The threads 38(1), 38(2) coordinate access to the shared resource 26 using store instructions (ST) and load instructions (LD) for Dekker-style synchronization. In particular, the contents of the memory locations M1 and M2 are initially zero. When the thread 38(1) on the processing device 28(1) is ready to access the shared resource 26, the thread 38(1) stores a non-zero value into the memory location M1 (i.e., ST M1), performs a standard memory barrier instruction (i.e., MEMBAR), provides a remote serialization command to the processing device 28(2) (i.e., REMOTE_MEMBAR), and loads the value of the memory location M2. If the value of the memory location M2 is non-zero, the thread 38(1) is blocked from accessing the shared resource 26 due to the thread 38(2) having a "lock" on the shared resource 26. Accordingly, the thread 38(1) then clears the memory location M1 and retries. However, if the value of the memory location M2 is zero, the thread 38(1) obtains a lock on the shared resource 26, accesses the shared resource 26, and then sets the memory location M1 back to zero.

Similarly, when the thread 38(2) is ready to access the shared resource 26, the thread 38(2) stores a non-zero value into the memory location M2, and loads the value of the memory location M1. If the value of the memory location M1 is non-zero, the thread 38(2) is blocked from accessing the shared resource 26 due to the thread 38(1) having a lock on the shared resource 26. In response, the thread 38(2) clears the memory location M2 and retries. However, if the value of the memory location M1 is zero, the thread 38(2) obtains a lock on the shared resource 26, accesses the shared resource 26, and then clears the memory location M2.

At this point it should be clear that the term "serialize" relates to reliable coordination between threads 38 to avoid an exclusion failure. In particular, suppose that a "fast thread" F executes {ST A; LD B} while a "slow thread" S executes {ST B; membar; Serialize(F); LD A}. The semantics of the "Serialize" operator, which could be implemented with the REMOTE_MEMBAR device, are such that, when S calls Serialize(F), one of the following is true:

(a) if F has yet to execute {LD B}, then when F executes {LD B}, the {LD B} operation performed by F will observe the value stored into B by S, or
(b) if F has already executed {ST A}, then when Serialize (F) returns, the {LD A} operation performed by S will observe the value stored into A by F.

In the context of the earlier-described thread 38(2) (e.g., a fast thread which frequently accesses a shared resource) and the earlier-described thread 38(1) (e.g., a slow thread which infrequently accesses the shared resource), such operation results in robust serialization.

As mentioned above, the Dekker synchronization portion of the thread 38(1) includes a standard memory barrier instruction MEMBAR as well as a remote serialization command REMOTE_MEMBAR. The standard MEMBAR instruction of the thread 38(1) causes the store buffer of the processing device 28(1) to drain thus making the results of any committed store operations performed by the processing device 28(1) visible to all other processing devices 28, e.g., making the just completed ST M1 operation visible to the thread 38(2). Additionally, the processing device 28(1) discards all speculative state for instructions past the MEMBAR instruction.

Accordingly, if the thread 38(2) running on the processing device 28(2) attempts to obtain a lock on the shared resource 26 after the thread 38(1) has stored a non-zero value in the memory location M1, this store operation will not be hidden from the thread 38(2). Rather, the MEMBAR instruction of the thread 38(1), which runs immediately after the ST M1 operation, drains the store buffer of the processing device 28(1) thus making the result of the ST M1 operation (i.e., store of a non-zero value within memory location M1) visible to the thread 38(2) before the thread 38(1) proceeds further. As a result, the thread 38(2) will be able to properly see whether the thread 38(1) has any lock on the shared resource 26 and thus avoid accessing the shared resource 26 at the same time.

Additionally, the REMOTE_MEMBAR command of the thread 38(1) directs the processing device 28(2) to drain its store buffer of any pending entries thus making the results of any issued store operations performed by the processing device 28(2) visible to all other processing devices 28. In particular, when the processing device 28(1) encounters the REMOTE_MEMBAR instruction within the thread 38(1), the processing device 28(1) provides an electronic signal 52 to the processing device 28(2) through the interconnect 50. The electronic signal 52 is configured to notify the processing device 28(2) that it is to drain its store buffer prior to executing further. When the processing device 28(2) receives this electronic signal 52 (e.g., an asserted command line on the interconnect 50), the processing device 28(2) then temporarily stops further execution, i.e., the serialization point. Next, the processing device 28(2) drains its store buffer and discards all speculative state for instructions past the serialization point (i.e., the processing device 28(2) rolls-back execution to the serialization point). As a result, any issued store operations which were buffered by the processing device 28(2) but not visible to other processing devices 28 now become visible.

After the processing device 28(2) has completely drained its store buffer, the processing device 28(2) provides an electronic signal 54 to the processing device 28(1) through the interconnect 50 with a result (e.g., a return value). In particular, the electronic signal 54 acknowledges the REMOTE_MEMBAR instruction and indicates that the processing device 28(2) has properly drained its store buffer so that the thread 38(1) running on the processing device 28(1) is now capable of viewing all store operations which had been buffered by the processing device 28(2) up to the point of receiving the electronic notification signal 52, i.e., the serialization point. At this point, the thread 38(1) running on the processing device 28(1) is able to run the load instruction (LD M2) to determine whether the thread 38(2) did in fact store a non-zero value into the memory location M2 to lock the shared resource 26. Similarly, the thread 38(2) running on the processing device 28(2) is now able to resumes execution at the serialization point.

In one arrangement, execution of the thread 38 blocks while the processing devices 28(1), 28(2) exchange the signals 52, 54. In particular, the thread 38 preferably waits to receive, as the electronic signal 54, either a first value if the REMOTE MEMBAR operation is successful (e.g., 0=GOOD) or a second value if the REMOTE_MEMBAR operation is unsuccessful (e.g., −1=FAILURE). Moreover, the processing device 28(1) is capable of being equipped with the same hardware enhancement for similar functionality but in the reverse direction for symmetric processing.

Additionally, in one arrangement, the thread 38(1) is capable of running the REMOTE_MEMBAR instruction from any mode, e.g., kernel mode, user mode, etc. It should be understood that, if the thread 38(1) is in user mode when running the REMOTE_MEMBAR instruction, there is no security concern because the REMOTE_MEMBAR instruction simply directs the processing device 28(2) to empty its store buffer. Since such draining of the store buffer would have occurred eventually, the REMOTE_MEMBAR instruction simply accelerates what would have taken place in any event.

In one arrangement, the acknowledgement phase (see the arrow 54) of the remote serialization guarantee mechanism 40 is capable of being implemented entirely in hardware. In this arrangement, the arrows 52, 54 are essentially electrical signals propagating across dedicated command lines of the interconnect 50 between the processing devices 28.

In another arrangement, the thread 38(1) is capable of passing an address to the processing device 28(2) and then invoking a cross-call procedure carried out by the processing device 28(2) stores a distinguished value into the memory location at that address. Here, the thread 38(1) initially sets the memory location to a predetermined value (e.g., zero), cross-calls to the processing device 28(2) passing the address of the memory location to the processing device 28(2), and then loops (fetching from the memory location) until the initial predetermined value is overwritten by the distinguished value (e.g., a non-zero value).

It should be understood that, in some circumstances where there are many processing devices 28, the thread 38(1) may not be able to easily determine which processing device 28 is running the thread 38(2). In one arrangement, the thread 38(1) is capable of utilizing a "broadcast" REMOTE_MEMBAR feature of the remote serialization guarantee mechanism 40. In this arrangement, the thread 38(2) sends the electronic signal 52 or cross-calls each processing device 28. That is, the thread 38(1) iterates over all processing devices 28 sending REMOTE_MEMBAR instructions to each processing device 28.

It should be further understood that there are alternatives to implementing an express REMOTE_MEMBAR instruction. For example, there are a variety of cross-call procedures (i.e., inter-processor interrupts) that cause remote processors to serialize. That is, these cross-call procedures are available to the thread 38(1) and cause the store buffers of the remote processors to drain. Examples of such cross-call procedures include VirtualProtect( ) which is available in the Windows operating system offered by Microsoft Corporation of Redmond, Wash., and mprotect( ) which is available in the Unix operating system. It should be understood that, in contrast to these cross-call procedures, an implementation of the REMOTE_MEMBAR instruction preferably omits a call to any interrupt handling routine thus imposing less overhead and providing shorter latencies than these cross-call procedures. An implementation scheme which utilizes a cross-call procedure such as VirtualProtect( ) or mprotect( ) is described in U.S. patent application Ser. No. 10/861,795, entitled "TECHNIQUES FOR ACCESSING A SHARED RESOURCE USING AN IMPROVED SYNCHRONIZATION MECHANISM", the entire teachings of which are hereby incorporated by reference.

It should be further understood that the thread 38(2) does not include any standard memory barrier instruction or any remote serialization command. Rather, the Dekker synchronization portion of the thread 38(2) is capable of running substantially unhindered. This situation is very well suited when the thread 38(1) attempts to access the shared resource 26 infrequently and the thread 38(2) attempts to access the shared resource 26 frequently. In particular, the cost incurred by the thread 38(1) is not very large since the thread 38(1) does not attempt to access the shared resource 26 very often. Furthermore, the cost incurred by the thread 38(2) is minimal since the thread 38(2) does not run any memory barrier instructions. That is, the only time the thread 38(2) is affected is when the thread 38(1) attempts to obtain a lock on the shared resource 26 by running the REMOTE_MEMBAR instruction which, as just mentioned, does not occur very often.

When the processing device 28(2) does receive the remote serialization command, the processing device 28(2) drains its store buffer up to the point of current execution. This is considered the serialization point, and all store operations up to this serialization point are now visible to all other processing devices 28. A summary of this operation will now be provided with reference to FIG. 3.

Figure 3:
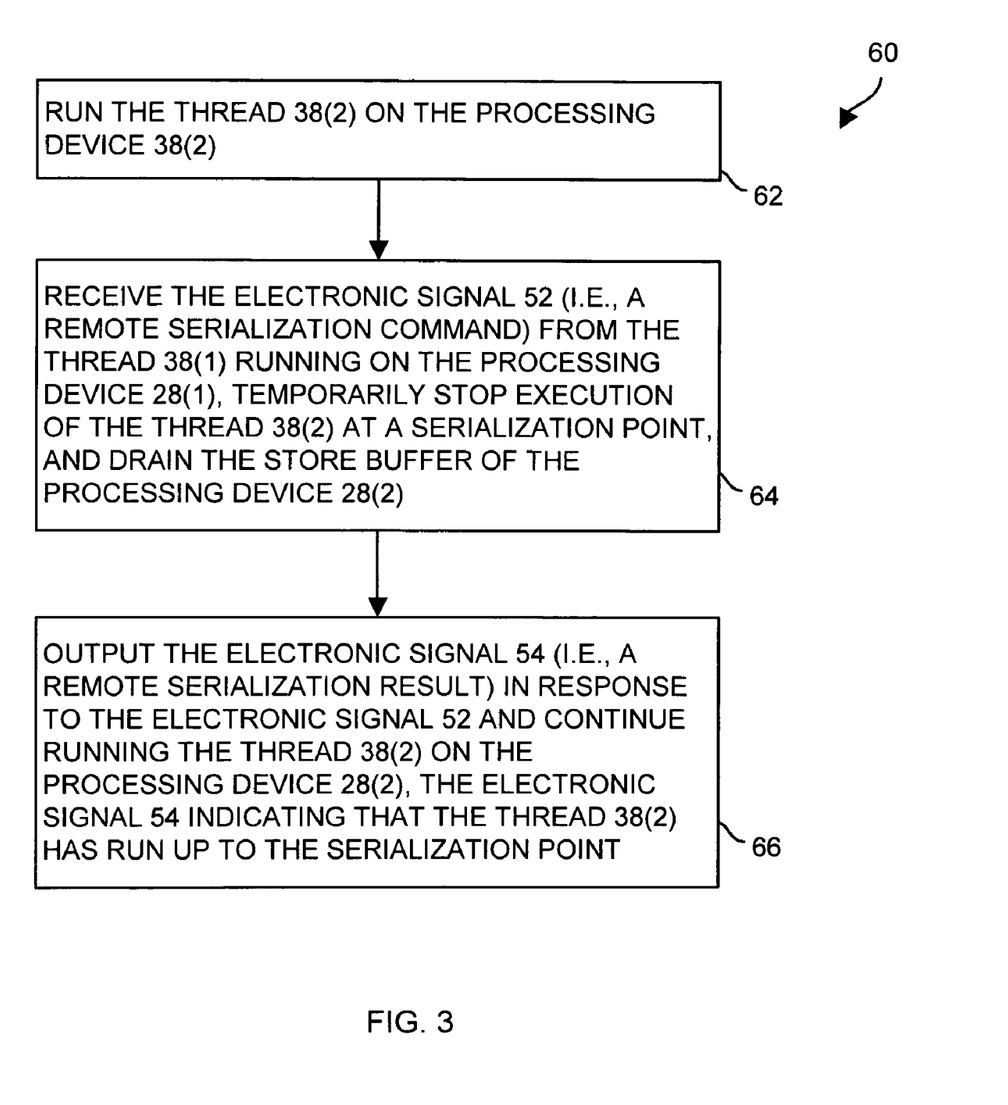
FIG. 3 is a flowchart of a procedure which is performed by a processing device of the control circuitry of FIG. 2.

FIG. 3 is a flowchart of a procedure 60 which is performed by the processing device 28(2) of the computerized system 20 when providing the remote serialization guarantee to the thread 38(1) running on the processing device 28(1). As mentioned earlier, this guarantee enables the thread 38(1) to view any buffered store operations on the processing device 28(2) thus enabling the thread 38(1) to prevent a possible exclusion failure. Such a guarantee also alleviates the need for the thread 38(2) to include any memory barrier instruction thus enabling the thread 38(2) to run in an optimized manner.

In step 62, the processing device 28(2) runs code of the thread 38(2). As illustrated in FIG. 2, the thread 38(2) includes Dekker-style store-load instructions (e.g., ST M2, LD M1) but without any standard MEMBAR instruction in order to run with high efficiency.

In step 64, the processing device 28(2) receives the remote serialization command, REMOTE_MEMBAR, from the thread 38(1) running on the processing device 28(1), temporarily stops execution and drains its store buffer. This step is illustrated in FIG. 2 by the arrow 52 which travels from the processing device 28(1) to the processing device 28(2) through the interconnect 50. Suppose that the processing device 28(2) receives the electronic signal 52 after issuing the ST M2 operation but before the ST M2 operation drains from the store buffer of the processing device 28(2). At this point, the processing device 28(2) has stored a non-zero value in the memory location M2, but this non-zero value is not yet visible to threads 38 on other processing devices 28. When the processing device 28(2) receives the electronic signal 52, the processing device 28(2) temporarily stops running the thread 38(2) and immediately drains its store buffer thus making the ST M2 operation visible to all other processing devices 28. Additionally, the processing device 28(2) discards all speculative state and rolls-back execution to the serialization point. Accordingly, the thread 38(1) running on the processing device 28 is now capable of viewing the buffered ST M2 operation and any other store operations buffered up to the point of receiving the remote serialization command, i.e., the serialization point.

In step 66, the processing device 28(2) transmits the response signal 54 (also see the arrow 54 in FIG. 2) to the processing device 28(1) in response to the electronic signal 52 and continues to run the thread 38(2). Similarly, the thread 38(1) running on the processing device 28(1) is now capable of reading from the memory location M2 to determine whether the shared memory 26 is already locked. There is no possibility of an exclusion failure since all buffered store operations on the processing device 28(2) up to the serialization point were made visible to the thread 38(1) prior to the thread 38(1) performing the LD M1 operation. Such operation is well suited for threads 38 which are asymmetric in their patterns for accessing the shared resource 26, i.e., the thread 38(1) infrequently accessing the shared resource 26 and thus not burdening the computer system 20 very often with memory barrier instructions, and the thread 38(2) frequently accessing the shared resource 26 and not running any memory barrier instructions.

Remote Injected Store Operation Embodiment

Figure 4:
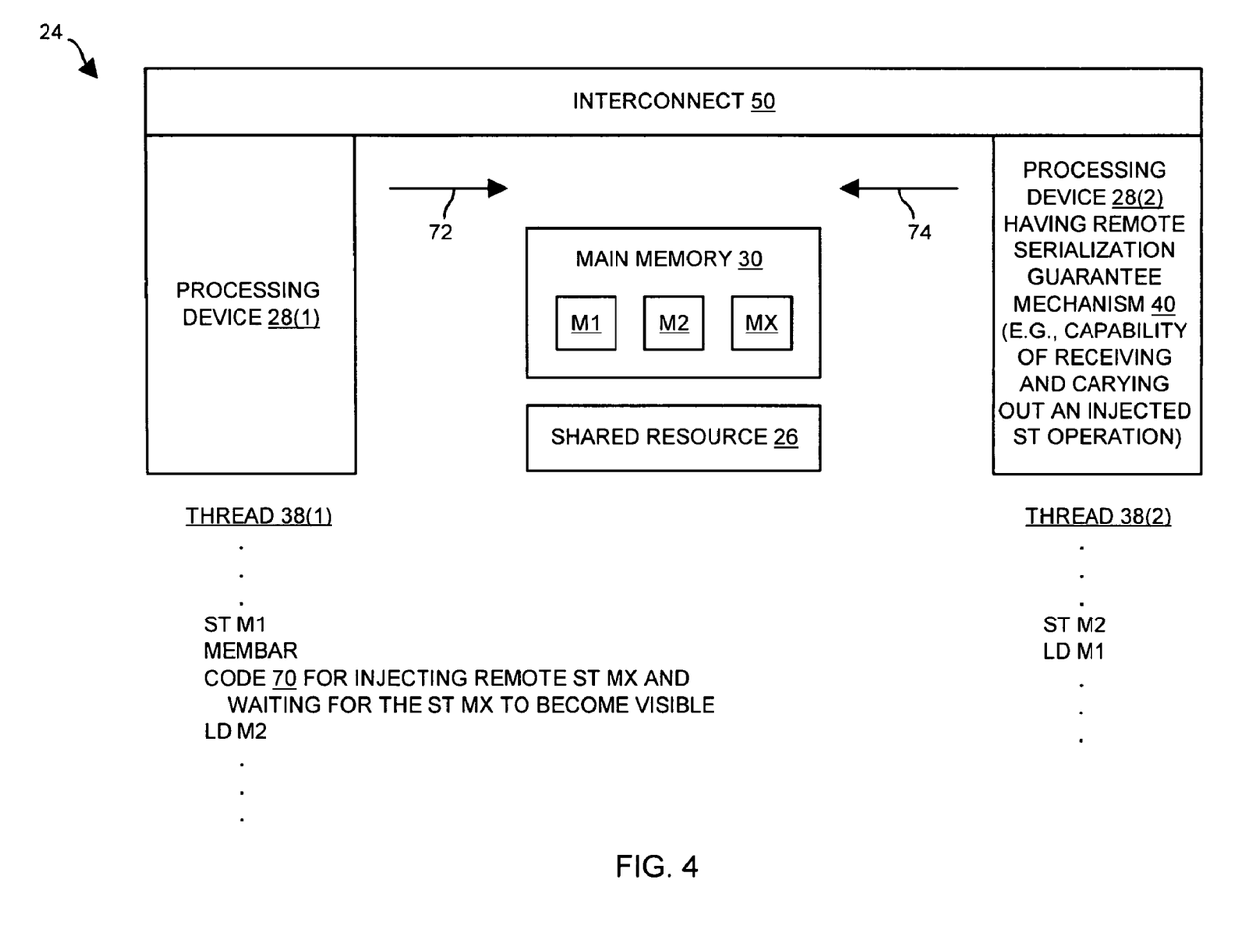
FIG. 4 is a block diagram of the control circuitry of the computerized system of FIG. 1 in accordance with a second embodiment.

FIG. 4 shows particular details of the control circuitry 24 of the computerized system 20 (FIG. 1) when the remote serialization guarantee mechanism 40 is implemented as an instruction injection mechanism within a standard set of processors, i.e., a thread 38 running on a first processing device 28 injects a store operation into the store buffer of a second processing device 28 so that, when the thread 38 sees the results of the store operation, the thread 38 knows with certainty that all store operations which were previously buffered by the second processing device 28 (i.e., the serialization point) are visible to the thread 38.

Again, there are two processing devices 28(1), 28(2) shown by way of example only, and other numbers of processing devices 28 are suitable for use as well. Additionally, there are memory locations M1, M2 and MX which are commonly accessible by the processing devices 28. The memory locations M1, M2 are initially set to zero. The memory location MX is initially set to a predetermined value (e.g., a non-zero number).

As in the earlier described embodiment of FIG. 2, the threads 38 running on the processing devices 28 of FIG. 4 are asymmetric in their patterns of accessing the shared resource 26. In particular, a first thread 38(1) running on the processing device 28(1) is configured to access the shared resource 26 infrequently. In contrast, a second thread 38(2) running on the processing device 28(2) is configured to access the shared resource 26 frequently.

Exemplary pseudo-code for the Dekker synchronization portions of the threads 38(1), 38(2) is as follows:

Thread 38(1):
ST M1
ST 1 into DRAINPENDINGFLAG
MEMBAR #storeload
Inject ST-of-0-into-DRAINPENDINGFLAG into the store queue of the processing 28(2) that executes or last executed thread 38(2)
LD DRAINPENDINGFLAG
wait for DRAINPENDINGFLAG to become 0
LD M2
Thread 38(2):
ST M2
LD M1

As shown in FIG. 4, the threads 38(1), 38(2) coordinate access to the shared resource 26 using store instructions (ST) and load instructions (LD) for Dekker-style synchronization. In particular, when the thread 38(1) on the processing device 28(1) is ready to access the shared resource 26, the thread 38(1) stores a non-zero value into the memory location M1 (i.e., ST M1), performs a standard memory barrier instruction (i.e., MEMBAR) to make that store operation visible to the thread 38(2) on the other processing device 28(2), runs code 70 which guarantees that the thread 38(1) is able to see all previously buffered store operations of the processing device 28(1), and loads the value of the memory location M2. If the value of the memory location M2 is non-zero, the thread 38(1) is blocked from accessing the shared resource 26 due to the thread 38(2) having a "lock" on the shared resource 26. Accordingly, the thread 38(1) then clears the memory location M1 and retries. However, if the value of the memory location M2 is zero, the thread 38(1) obtains a lock on the shared resource 26, accesses the shared resource 26, and then sets the memory location M1 back to zero.

Similarly, when the thread 38(2) is ready to access the shared resource 26, the thread 38(2) stores a non-zero value into the memory location M2, and loads the value of the memory location M1. If the value of the memory location M1 is non-zero, the thread 38(2) is blocked from accessing the shared resource 26 due to the thread 38(1) having a lock on the shared resource 26. In response, the thread 38(2) clears the memory location M2 and retries. However, if the value of the memory location M1 is zero, the thread 38(2) obtains a lock on the shared resource 26, accesses the shared resource 26, and then clears the memory location M2.

In a manner similar to that of the REMOTE_MEMBAR instruction described above in connection with FIGS. 2 and 3, the code 70 enables the thread 38(1) to determine when all of the buffered store operations of the processing device 28(2) up to a serialization point are visible to the thread 38(1). Such a feature enables the thread 38(1) to reliably synchronize with the thread 38(2) running on the processing device 28(2) and thus avoid an exclusion failure. In particular, the code 70 includes a first instruction, ST MX, which injects a store operation in the store buffer of the processing device 28(2), and subsequent operations that wait for the injected store operation to become visible, i.e., check for the memory location MX to change value. During these subsequent operations, the thread 38(1) can perform additional work, i.e., perform other functions.

The injection of the store operation (ST MX) into the store buffer of the processing device 28(2) by the thread 38(1) is illustrated in FIG. 4 by the arrow 72. In response to such injection, the processing device 28(2) either commits any in-flight store operations before injecting the ST MX store operation, or cancels all in-flight store operations. The carrying out of the store operation (ST MX) in response to the injected store operation (i.e., making the result of the injected store operation visible to other processing devices 28) is illustrated in FIG. 4 by the arrow 74.

It should be understood that injection of the store operation results in the store operation residing at the end of the store buffer. Accordingly, the injected store instruction does not become visible to the thread 38(1) until all previously buffered store operations become visible to the thread 38(1). Thus, when the thread 38(1) sees the result of the injected store operation, the thread 38(1) knows with certainty that all previously buffered store operations up to the point of store operation injection, i.e., the serialization point, are now visible. Before proceeding (e.g., to the LD M2 instruction), the thread 38(1) restores the memory location MX back to the initial predetermined value.

In some arrangements, the memory location MX is initially non-zero, and the injected store operation sets the contents to zero. Such an arrangement optimizes bandwidth through the interconnect 50 since the injected store operation is capable of taking the form of a command (ST) and a memory location address (MX) without providing any value (i.e., zero being a default value). Accordingly, when the thread 38(1) sees the memory location MX change to zero, the thread 38(1) knows that the processing device 28(2) has made visible all buffered store operations up to and including the injected store operation.

In other arrangements, the memory location MX is initially zero, and the injected store operation sets the memory location MX to non-zero. In these other arrangement, when the thread 38(1) sees the memory location MX change to non-zero, the thread 38(1) knows that the processing device 28(2) has made visible all buffered store operations up to and including the injected store operation.

In some arrangements, the thread 38(1) is capable of injecting the store operation into the store buffer of the processing device 28(2) while the thread 38(1) is in any mode, e.g., kernel mode, user mode, etc. Accordingly, either user mode code or higher privileged code is capable of utilizing the remote serialization guarantee mechanism 40 of the computerized system 20.

Again, as mentioned above in connection with the first embodiment, the remote serialization guarantee mechanism 40 of the second embodiment, does not require that that the thread 38(2) have a memory barrier instruction. Rather, the Dekker synchronization portion of the thread 38(2) is capable of being memory barrier instruction free. This situation is very well suited when the thread 38(1) attempts to access the shared resource 26 infrequently and the thread 38(2) attempts to access the shared resource 26 frequently.

There are a variety of modifications and enhancements which are suitable for this second embodiment. For example, it should be understood that, in some circumstances where there are many processing devices 28, the thread 38(1) may not be able to easily determine which processing device 28 is running the thread 38(2). In one arrangement, the thread 38(1) is capable of utilizing a "broadcast" store injection feature of the remote serialization guarantee mechanism 40. In this arrangement, the thread 38(2) injects store instructions into the store buffers of all processing devices 28 of the system 20. That is, the thread 38(1) iterates over all processing devices 28 sending, to each processing device 28, a store instruction associated with a respective memory location or flag, e.g., MX(1), MX(2), MX(3), and so on. The thread 38(1) then waits until it sees the distinguished value in each memory location.

In one arrangement, the broadcast mechanism is implemented in hardware and the pseudo-code for the threads 38 is as follows:

Thread 38(1):
ST M1
ST 1 into DRAINPENDINGFLAG[i], for each CPUID i
MEMBAR #storeload
broadcast-remote-store address of DRAINPENDING-
    FLAG array wait until all DRAINPENDINGFLAG[i]
    become 0.
LD M2
Thread 38(2):
STM2
LDM1

Here, the broadcast-remote-store instruction directs each processing device 28 to add its own unique identifier (CPUID) to the designated address and then inject a store-zero instruction into its local store buffer.

Preferably, the broadcast-remote-store operation is encoded as a store to a special address space identifier (ASI) where the address represents the store-to address to be transmitted to other processing devices 28 and the store value encodes a CPUID, or a bit mask of CPUIDs. For example, versions of the Solarist® operating system provides a mechanism called "schedctl" by which one thread is capable of determining the identity of a CPU on which another thread runs or last ran; that is, each thread has a private "sc_cpu" field, and any thread is capable of reading the "sc_cpu" field of another thread with a simple load instruction. As the kernel dispatches a thread onto a processor, it sets the thread's "sc_cpu" field to the CPUID of the processor. Using the "sc_cpu" fields allows the threads to avoid broadcasts and directing cross-calls or inject-store-of-zero requests to processors individually.

It should be understood that the thread 38(1) might load the "sc_cpu" value of the thread 38(2) and then the thread 38(2) might (i) be preempted by another thread, or (b) migrate to some other processing device 28 before thread 38(1) sends a cross-call or pass a remote store to the processing device 28 identified by the fetched "sc_cpu" value. That is, the "sc_cpu" value fetched by the thread 38(1) can become stale and out-of-date almost immediately. This condition is benign as both context switches (being descheduled from a processing device 28 (called "going OFFPROC" in Solarisg terminology) and migration cause threads to serialize execution. In any case, if the thread 38(2) is still running on the same processing device 28, if the thread 38(2) has migrated to another processing device 28, or if the thread 38(2) has been preempted and is not running, then, at the time the processing device 28 acknowledges the cross-call or the remote store, the thread 38(1) knows that if thread 38(2) was in the midst of its Dekker-synchronization portion (i.e., the ST M2; LD M1 portion, also see FIG. 4) that either the latent ST M2, if any, will be visible to the thread 38(1), or the LD M1 by the thread 38(2) will observe the value recently stored by the thread 38(1).

Additionally, it should be understood that the operation for injecting a store instruction into another processing device 28 is capable of being enhanced to selectively inject or not inject a store operation based on the status of the thread 38(2) (i.e., the fast thread). In one arrangement, the thread 38(1) (i.e., the slow thread) passes both the ST MX instruction and the address of M2 to the processing device 28(2). If the processing device 28(2) has a store operation for the address M2 buffered in its store buffer, the processing device 28(2) injects the ST MX into its store buffer. However, if the processing device 28(2) does not have a store operation for the address M2 buffered in its store buffer, the processing device 28(2) immediately stores the distinguished value in the memory location MX for minimal latency. As an alternative, the thread 38(1) simply stalls waiting for acknowledgement from the processing device 28(2) (e.g., a return value as illustrated by the arrow 74 in FIG. 4).

Issued Counter/Completed Counter Embodiment

Figure 5:
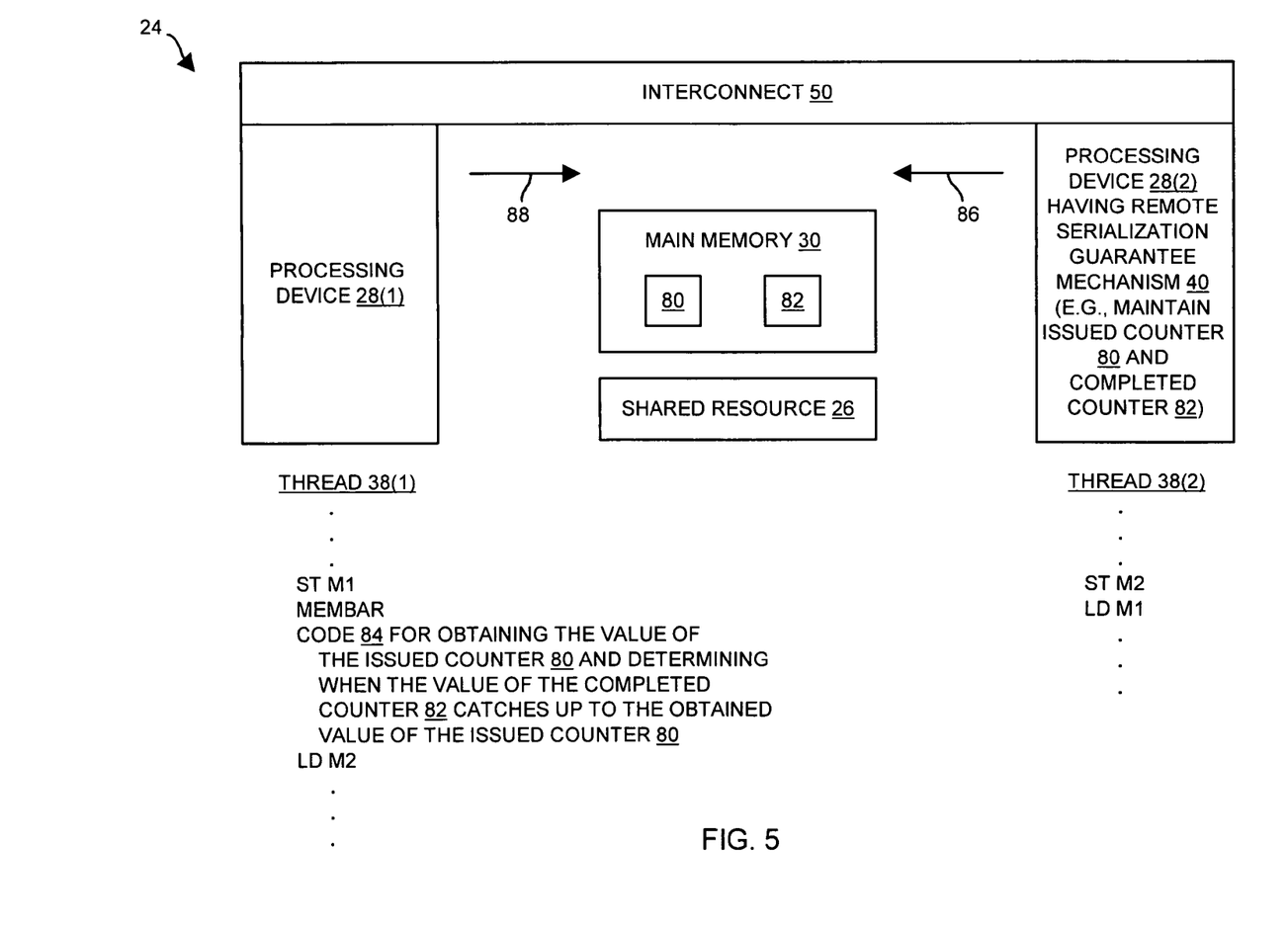
FIG. 5 is a block diagram of the control circuitry of the computerized system of FIG. 1 in accordance with a third embodiment.

FIG. 5 shows particular details of the control circuitry 24 of the computerized system 20 (FIG. 1) when the remote serialization guarantee mechanism 40 is implemented using counters, i.e., a thread 38 running on a first processing device 28 reads an "issued" counter and subsequently reads a "completed" counter maintained by a second processing device 28 to determine when all store operations buffered by the second processing device 28 up to the point of reading the issued counter are now visible to the thread 38.

In this third embodiment, there are two processing devices 28(1), 28(2) shown by way of example only, and other numbers of processing devices 28 are suitable for use as well. The processing device 28(2) maintains an issued counter 80 and a completed counter 82. The processing device 28(2) initializes both the "issued" counter 80 and the "completed" counter 82 to a starting value (e.g., zero), and then updates the counters 80, 82 in an ongoing basis. In particular, the processing device 28(2) advances the value of the "issued" counter 80 every time the processing device 28 issues a store operation. Additionally, the processing device 28(2) advances the value of the "completed" counter 82 every time the processing device 28 either makes an issued store operation visible to the other processors 28 or cancels a store operation (e.g., a speculatively executed store operation). Accordingly, the "completed" counter 82 is essentially a tail counter that chases the "issued" counter 80 which is essentially a head counter and, if the values of both counters are equal, there are no store operations buffered in the processing device 28(2).

Again, the threads 38 running on the processing devices 28 of FIG. 5 preferably are asymmetric in their patterns of accessing the shared resource 26. In particular, a first thread 38(1) running on the processing device 28(1) is configured to access the shared resource 26 infrequently. In contrast, a second thread 38(2) running on the processing device 28(2) is configured to access the shared resource 26 frequently.

As shown in FIG. 5, the threads 38(1), 38(2) coordinate access to the shared resource 26 using store instructions (ST) and load instructions (LD) for Dekker-style synchronization. In particular, when the thread 38(1) on the processing device 28(1) is ready to access the shared resource 26, the thread 38(1) stores a non-zero value into the memory location M1 (i.e., ST M1), performs a standard memory barrier instruction (i.e., MEMBAR) to make that store operation visible to the thread 38(2) on the other processing device 28(2), runs code 84 which guarantees that the thread 38(1) is able to see all previously buffered store operations of the processing device 28(1), and loads the value of the memory location M2. If the value of the memory location M2 is non-zero, the thread 38(1) is blocked from accessing the shared resource 26 due to the thread 38(2) having a "lock" on the shared resource 26. Accordingly, the thread 38(1) then clears the memory location M1 and retries. However, if the value of the memory location M2 is zero, the thread 38(1) obtains a lock on the shared resource 26, accesses the shared resource 26, and then sets the memory location M1 back to zero.

Similarly, when the thread 38(2) is ready to access the shared resource 26, the thread 38(2) stores a non-zero value into the memory location M2, and loads the value of the memory location M1. If the value of the memory location M1 is non-zero, the thread 38(2) is blocked from accessing the shared resource 26 due to the thread 38(1) having a lock on the shared resource 26. In response, the thread 38(2) clears the memory location M2 and retries. However, if the value of the memory location M1 is zero, the thread 38(2) obtains a lock on the shared resource 26, accesses the shared resource 26, and then clears the memory location M2.

The code 84 enables the thread 38(1) to determine when all of the buffered store operations of the processing device 28(2) up to a serialization point are visible to the thread 38(1). Such a feature enables the thread 38(1) to reliably synchronize with the thread 38(2) running on the processing device 28(2) and thus avoid an exclusion failure. In particular, the code 84 includes a section of code which obtains the value of the "issued" counter 80, and determines when the value of the "completed" counter 82 catches up to the obtained value of the "issued" counter 80. During this code section, the thread 38(1) can perform additional work, i.e., run other instructions.

The updating of the values of the counters 80, 82 by the processing device 28(2) is illustrated in FIG. 4 by the arrow 86. The obtaining of the values of the counters 80, 82 by the processing device 28(1) is illustrated in FIG. 4 by the arrow 88.

It should be understood that, when the processing device 28(1) obtains the value of the "issued" counter 80, the obtained value of the "issued" counter 80 represents a count of the number of store operations issued by the processing device 28(2) up to this point (i.e., the serialization point), since the processing device (2) began updating the "issued" counter 80 (e.g., from a starting value of zero). Additionally, when the processing device 28(1) subsequently obtains the value of the "completed" counter 82, the obtained value of the "completed" counter 82 represents a count of the number of store operations completed or canceled by the processing device 28(2) since the processing device (2) began updating the "completed" counter 82 (e.g., from a starting value of zero).

If the obtained value of the "completed" counter 82 is not advanced to the value of the "issued" counter 80, the store buffer of the processing device 28(2) holds store operations that were issued by the processing device 28(2) prior to obtaining the value of the "issued" counter 80 but that have not yet drained from the store buffer. Accordingly, such store operations are not yet visible to the thread 38(1).

However, if the obtained value of the "completed" counter 82 is advanced at least to the value of the "issued" counter 80, all store operations which were issued by the processing device 28(2) prior to obtaining the value of the "issued" counter 80 (i.e., up to the serialization point) have been drained from the store buffer. Accordingly, such store operations are visible to the thread 38(1) and the thread 38(1) is now capable of proceeding to the load instruction LD M2 with certainty that it will not create an exclusion failure by inadvertently failing to detect a lock on the shared resource 26 by the thread 38(2). Rather, robust serialization exists for reliable synchronization between the threads 38(1), 38(2).

In some arrangements, the thread 38(1) is capable of accessing the counters 80, 82 in any mode, e.g., kernel mode, user mode, etc. Accordingly, either user mode code or higher privileged code is capable of utilizing the remote serialization guarantee mechanism 40 of the computerized system 20.

Again, as mentioned above in connection with the first and second embodiments, the remote serialization guarantee mechanism 40 of the third embodiment, does not require that that the thread 38(2) have a memory barrier instruction. Rather, the Dekker synchronization portion of the thread 38(2) is capable of being memory barrier instruction free. This situation is very well suited when the thread 38(1) attempts to access the shared resource 26 infrequently and the thread 38(2) attempts to access the shared resource 26 frequently.

CONCLUSION

As mentioned above, embodiments of the present invention are directed to techniques for providing a remote serialization guarantee within a computerized system 20 which utilizes a processor architecture in which it is possible for threads 38 to view operations of other threads 38 out of order. In particular, a thread 38(1) running on a processing device 28(1) is capable of sending a serialization command to another processing device 28(2). The other processing device 28(2) responds to the serialization command by returning a serialization result guaranteeing that the thread 38(1) running on the processing device 28(1) is now capable of viewing all store operations which had been buffered by the processing device 28(2) up to the point of receiving the serialization command, i.e., the serialization point. Accordingly, if the thread 38(1) is ready to acquire a lock on a shared resource 26 using a Dekker store-load synchronization mechanism, the thread 38(1) can invoke the serialization command to make sure that there is not another thread 38 that has already locked the shared resource 26 (i.e., all store operations buffered on the other processing device 28(2) will be made visible to the thread 38(1)) and thus avoid an exclusion failure. Furthermore, since such a serialization guarantee is capable of being obtained by the thread 38(1) in a remote manner, another thread 38(2) running on the processing device 28(2) does not need to run any memory barrier instruction and thus is capable of running in more efficiently.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the control circuitry 24 was described above as including an interconnect 50 by way of example only and that other configurations are suitable for use by the invention. In one arrangement, multiple processing devices 28 reside on a single die in a highly integrated manner thus alleviating the need for the interconnect 50. In particular, the some current CMP or SMT processors implement more than one processor on a given core. Communication between "virtual processors" (sometimes call "strands") is on-die and has extremely low-latency. Accordingly, in some respects, the remote serialization guarantee mechanism 40 is better suited in these configurations than on a traditional SMP system where to cross-calls or remote-store requests would need to traverse a bus or interconnect such as that shown in FIGS. 2, 4 and 5).

Additionally, it should be understood that the above-described embodiments were illustrated with classic mutual exclusion. Other configurations and arrangements are suitable as well such as "JNI Execution Barriers" which are described in earlier-referenced U.S. patent application Ser. No. 10/861,795.

Furthermore, the mutual exclusion mechanisms described above are also applicable to other constructs such as POSIX pthreads mutexes, Java Monitors, the synchronization primitives provided in Microsoft's NET CLR (Common Language Runtime), and the like.

Additionally, it should be understood that the techniques of the various embodiments of the invention are not restricted to TSO and the SPARC® Architecture. Other architectures are suitable for use by the invention as well. Such modifications and enhancements are intended to belong to various embodiments of the invention.

What is claimed is:

1. A method for providing a remote serialization guarantee within a computerized system, the method comprising:

receiving a remote serialization command from a first thread running within the computerized system, and wherein receiving the remote serialization command from the first thread running within the computerized system includes obtaining a command to perform a store instruction from the first thread;

running a second thread up to a serialization point, wherein running the second thread up to the serialization point includes making all second thread instructions, which had executed by the time that the command to perform the store instruction was obtained from the first thread, visible to the first thread; and outputting a remote serialization result in response to the remote serialization command, the remote serialization result indicating that the second thread has run up to the serialization point wherein outputting the remote serialization result in response to the remote serialization command includes providing an acknowledgement to the first thread that the store instruction has been performed;

wherein receiving the remote serialization command from the first thread running within the computerized system includes obtaining a remote memory barrier instruction from the first thread; and wherein running the second thread up to the serialization point includes making all second thread instructions, which had executed by the time that the remote memory barrier instruction was obtained from the first thread, visible to the first thread.

2. The method of claim 1 wherein the computerized system includes a processing device which runs the second thread, and wherein providing the acknowledgement to the first thread includes:

transmitting, as the acknowledgement to the first thread, an electrical signal notifying the first thread that a hardware mechanism of the processing device has performed a remote memory barrier instruction on behalf of the first thread.

3. The method of claim 1 wherein the remote memory barrier instruction obtained from the first thread includes a memory address, the memory address identifying a memory location initially containing an initial value provided by the first thread, and wherein providing the acknowledgement to the first thread includes:
storing, as the acknowledgement to the first thread, a new value in the memory location identified by the memory address, the new value being different than the initial value.

4. The method of claim 1 wherein receiving the remote serialization command from the first thread running within the computerized system includes obtaining one of multiple remote memory barrier instructions sent from the first thread to respective processing devices of the computerized system.

5. The method of claim 1 wherein the remote memory barrier instruction is a user-mode privileged command provided by the first thread.

6. The method of claim 1 wherein the user-mode privileged remote memory barrier instruction is configured to omit a call to any interrupt handling routine.

7. The method of claim 1 wherein obtaining the command to perform the store instruction from the first thread includes acquiring a remote store-of-zero instruction having a memory address from the first thread, and wherein providing the acknowledgement to the first thread includes storing zero into a memory location identified by the memory address.

8. The method of claim 7 wherein obtaining the command to perform the store instruction from the first thread further includes acquiring another memory address which identifies a memory location for identifying whether the second thread has a lock on a shared resource.

9. The method of claim 1, further comprising:
supplying a head counter value to the first thread, the head counter value identifying a number of store instructions issued;
wherein receiving the remote serialization command from the first thread running within the computerized system includes obtaining a tail counter request from the first thread, the tail counter request asking for a tail counter value identifying a number of store instructions completed;
wherein running the second thread up to the serialization point includes advancing the tail counter value up to the head counter value supplied to the first thread; and
wherein outputting the remote serialization result in response to the remote serialization command includes providing the tail counter value to the first thread to indicate that the second thread has run up to the serialization point.

10. The method of claim 9 wherein advancing the tail counter value up to the head counter value supplied to the first thread includes incrementing the tail counter value in response to draining a store buffer regardless of whether the store buffer drains due to commitment of a store operation or cancellation of the store operation.

11. The method of claim 1 wherein said receiving a remote serialization command includes the first thread injecting store instructions into the store buffers of all processors of the system.

12. A computerized system, comprising:
a first processing device;
a second processing device; and
an interconnect which connects the first and second processing devices together; the second processing device being configured to provide a remote serialization guarantee; the second processing device, when providing the remote serialization guarantee, being configured to:
receive a remote serialization command from a first thread running on the first processing device through the interconnect, and wherein the second processing device, when receiving the remote serialization command from the first thread running within the computerized system, is configured to obtain a command to perform a store instruction from the first thread;
run a second thread up to a serialization point wherein the second processing device, when running the second thread up to the serialization point, is configured to make all second thread instructions, which had executed by the time that the command to perform the store instruction was obtained from the first thread, visible to the first thread;
output a remote serialization result to the first processing device through the interconnect in response to the remote serialization command, the remote serialization result indicating that the second thread has run up to the serialization point, wherein the second processing device, when outputting the remote serialization result in response to the remote serialization command, is configured to provide an acknowledgement to the first thread that the store instruction has been performed;
wherein the second processing device, when receiving the remote serialization command from the first thread running within the computerized system, is configured to obtain a remote memory barrier instruction from the first thread; and
wherein the second processing device, when running the second thread up to the serialization point, is configured to make all second thread instructions, which had executed by the time that the remote memory barrier instruction was obtained from the first thread, visible to the first thread.

13. The computerized system of claim 12 wherein the remote memory barrier instruction is a user-mode privileged command provided by the first thread.

14. The computerized system of claim 12 wherein the user-mode privileged remote memory barrier instruction which is configured to omit a call to any interrupt handling routine.

15. The computerized system of claim 12 wherein the second processing device is further configured to:
supply a head counter value to the first thread, the head counter value identifying a number of store instructions issued;
wherein the second processing device, when receiving the remote serialization command from the first thread running within the computerized system, is configured to obtain a tail counter request from the first thread, the tail counter request asking for a tail counter value identifying a number of store instructions completed;
wherein the second processing device, when running the second thread up to the serialization point, is configured to advance the tail counter value up to the head counter value supplied to the first thread; and
wherein the second processing device, when outputting the remote serialization result in response to the remote serialization command, is configured to provide the tail counter value to the first thread to indicate that the second thread has run up the serialization point.

16. The system of claim 12 wherein said remote serialization command includes the first thread injecting store instructions into the store buffers of all processors of the system.

17. A processing device for providing a remote serialization guarantee, comprising:
   an input;
   an output; and
   a controller coupled to the input and the output, the controller being configured to:
   receive a remote serialization command from a first thread running on another processing device through the input, wherein the controller, when receiving the remote serialization command from the first thread running within the computerized system, is configured to obtain a remote memory barrier instruction from the first thread;
   run a second thread up to a serialization point wherein the controller, when running the second thread up to the serialization point, is configured to make all second thread instructions, which had executed by the time that the remote memory barrier instruction was obtained from the first thread, visible to the first thread; and
   output a remote serialization result through the output in response to the remote serialization command, the remote serialization result indicating that the second thread has run up to the serialization point, wherein the controller, when outputting the remote serialization result in response to the remote serialization command, is configured to provide an acknowledgement to the first thread that the remote memory barrier instruction is complete.

18. The processing device of claim 17 wherein the remote memory barrier instruction is a user-mode privileged command provided by the first thread.

19. The processing device of claim 17 wherein the user-mode privileged remote memory barrier instruction which is configured to omit a call to any interrupt handling routine.

20. The processing device of claim 17 wherein the controller, when receiving the remote serialization command from the first thread running within the computerized system, is configured to obtain a command to perform a store instruction from the first thread;
   wherein the controller, when running the second thread up to the serialization point, is configured to make all second thread instructions, which had executed by the time that the command to perform the store instruction was obtained from the first thread, visible to the first thread; and
   wherein the controller, when outputting the remote serialization result in response to the remote serialization command, is configured to provide an acknowledgement to the first thread that the store instruction has been performed.

21. The processing device of claim 17 wherein the controller is further configured to:
   supply a head counter value to the first thread, the head counter value identifying a number of store instructions issued;
   wherein the controller, when receiving the remote serialization command from the first thread running within the computerized system, is configured to obtain a tail counter request from the first thread, the tail counter request asking for a tail counter value identifying a number of store instructions completed;
   wherein the controller, when running the second thread up to the serialization point, is configured to advance the tail counter value up to the head counter value supplied to the first thread; and
   wherein the controller, when outputting the remote serialization result in response to the remote serialization command, is configured to provide the tail counter value to the first thread to indicate that the second thread has run up to the serialization point.

22. The processing device of claim 17 wherein said remote serialization command includes the first thread injecting store instructions into the store buffers of all processors of the system.

* * * * *